(12) United States Patent
Allen et al.

(10) Patent No.: US 7,509,729 B2
(45) Date of Patent: Mar. 31, 2009

(54) METHOD FOR MAKING A PERPENDICULAR MAGNETIC RECORDING WRITE HEAD

(75) Inventors: Donald G. Allen, Morgan Hill, CA (US); Amanda Baer, Campbell, CA (US); Michael Feldbaum, San Jose, CA (US); Hung-Chin Guthrie, Saratoga, CA (US); Aron Pentek, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 415 days.

(21) Appl. No.: 11/380,189

(22) Filed: Apr. 25, 2006

(65) Prior Publication Data

US 2007/0245544 A1 Oct. 25, 2007

(51) Int. Cl.
  *G11B 5/127* (2006.01)
  *H04R 31/00* (2006.01)
(52) U.S. Cl. .............. 29/603.16; 29/603.11; 29/603.13; 29/603.15; 29/603.18; 204/192.32; 204/192.33; 204/192.35; 216/62; 216/65; 216/66; 360/121; 360/122; 360/317; 451/5; 451/41
(58) Field of Classification Search .............. 29/603.11, 29/603.13–603.16, 603.18; 360/121, 122, 360/126, 317; 204/192.32, 192.33, 192.35; 216/62, 65, 66; 451/5, 41
See application file for complete search history.

(56) References Cited

U.S. PATENT DOCUMENTS

| | | | |
|---|---|---|---|
| 5,930,639 A * | 7/1999 | Schuele et al. | 438/396 |
| 6,878,240 B2 * | 4/2005 | Bus-Kwofie et al. | 204/192.11 |
| 7,009,812 B2 | 3/2006 | Hsu et al. | |
| 7,186,348 B2 * | 3/2007 | Chen et al. | 216/22 |
| 2005/0068665 A1 | 3/2005 | Le et al. | |
| 2005/0243464 A1 | 11/2005 | Lille | |
| 2005/0259355 A1 | 11/2005 | Gao et al. | |
| 2005/0264931 A1 | 12/2005 | McFadyen | |
| 2006/0044681 A1 * | 3/2006 | Le et al. | 360/126 |

OTHER PUBLICATIONS

A. I. Stognij et al., "Reactive Ion Beam Etching of Thick Polyimide Layers in an Argon+Oxygen Mixture", Russian Microelectronics, vol. 30, No. 5, 2001, pp. 330-334.

* cited by examiner

*Primary Examiner*—Paul D Kim
(74) *Attorney, Agent, or Firm*—Thomas R. Berthold

(57) ABSTRACT

A method for making a write pole in a perpendicular magnetic recording write head uses a metal mask to pattern the primary resist and only ion milling during the subsequent patterning steps. A layer of primary resist is deposited over the magnetic write pole material and a metal mask layer is deposited on the primary resist layer. An imaging resist layer is formed on the metal mask layer and lithographically patterned generally in the desired shape of the write pole. Ion milling without a reactive gas is then performed over the imaging resist pattern to pattern the underlying metal mask layer, which is then used as the mask to define the shape of the primary resist pattern. Ion milling with oxygen is then performed over the metal mask pattern to pattern the underlying primary resist. Ion milling without a reactive gas is then performed over the primary resist pattern to form the underlying write pole.

6 Claims, 7 Drawing Sheets

METHOD FOR MAKING A PERPENDICULAR MAGNETIC RECORDING WRITE HEAD

BACKGROUND OF THE INVENTION

1. Field of the Invention

This invention relates generally to perpendicular magnetic recording write heads, and more particularly to a method for making the write pole of a write head for use in a magnetic recording hard disk drive.

2. Description of the Related Art

Figure 1A:
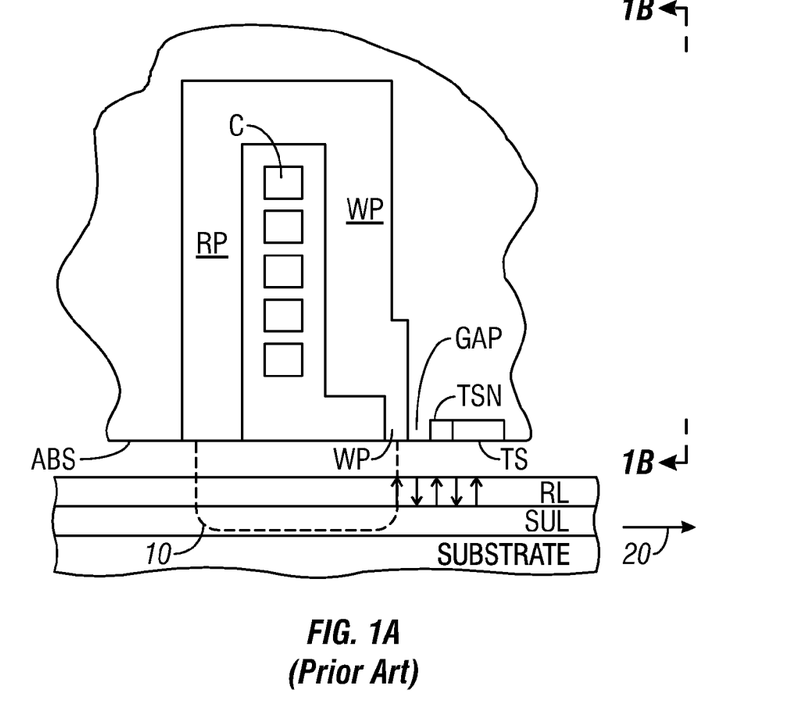
FIG. 1A is a schematic of a prior art perpendicular magnetic recording system.

Perpendicular magnetic recording, wherein the recorded bits are stored in a perpendicular or out-of-plane orientation in the recording layer, is a promising path toward ultra-high recording densities in magnetic recording hard disk drives. As shown in FIG. 1A, a "dual-layer" medium includes a perpendicular magnetic data recording layer (RL) on a "soft" or relatively low-coercivity magnetically permeable underlayer (SUL) formed on the disk substrate. This type of medium is shown with a single write pole (WP) type of recording head. A thin film coil (C) is shown in section between the WP and the return pole (RP) of the recording head. Write current through coil C induces a magnetic field (shown by dashed line 10) from the WP that passes through the RL (to magnetize the region of the RL beneath the WP), through the flux return path provided by the SUL, and back to the RP. The recording head is typically formed on an air-bearing slider that has its air-bearing surface (ABS) supported above the RL of the medium. In FIG. 1A, the medium moves past the recording head in the direction indicated by arrow 20. The RL is illustrated with perpendicularly recorded or magnetized regions, with adjacent regions having opposite magnetization directions, as represented by the arrows. The magnetic transitions between adjacent oppositely-directed magnetized regions are detectable by the read head (not shown) as the recorded bits.

Figure 1B:
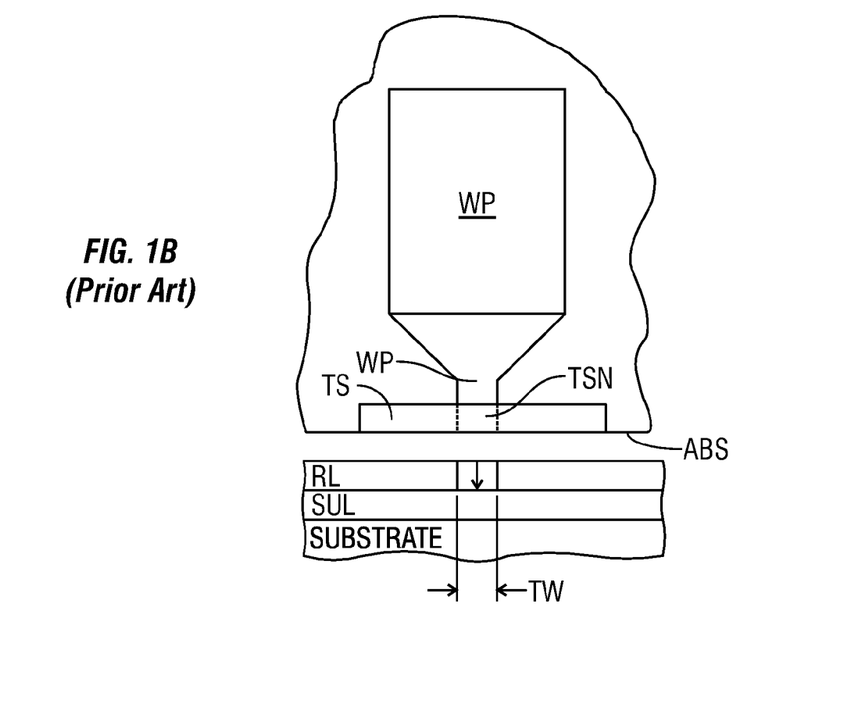
FIG. 1B is a view in the direction 1B-1B of FIG. 1A and illustrates the width of the WP to substantially define the trackwidth (TW) of the data recorded in the RL.
Figure 2:
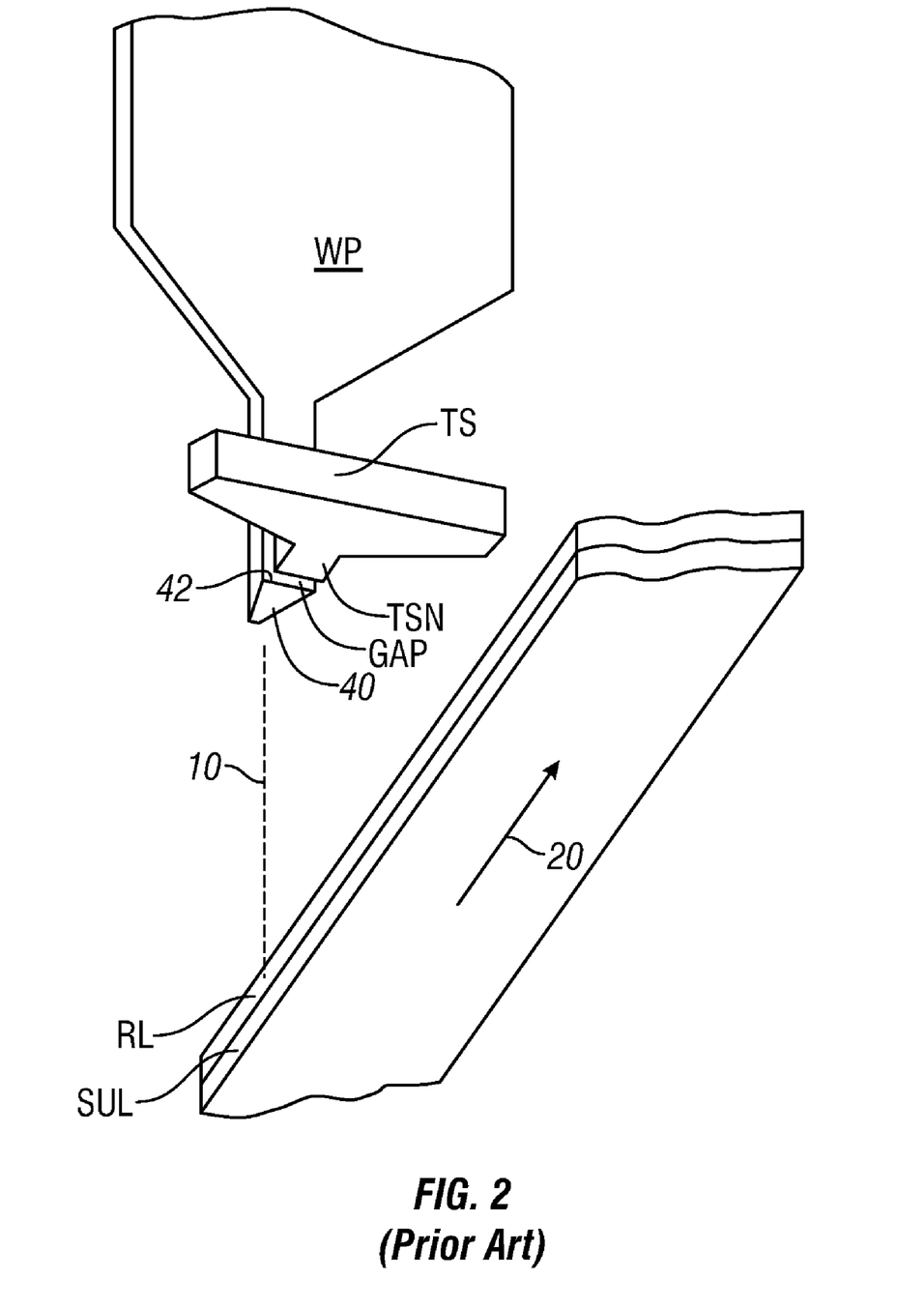
FIG. 2 is a perspective view showing the relationship between the WP, the TS with TSN, and the recording medium with the RL for the system of FIG. 1A.
Figure 3:
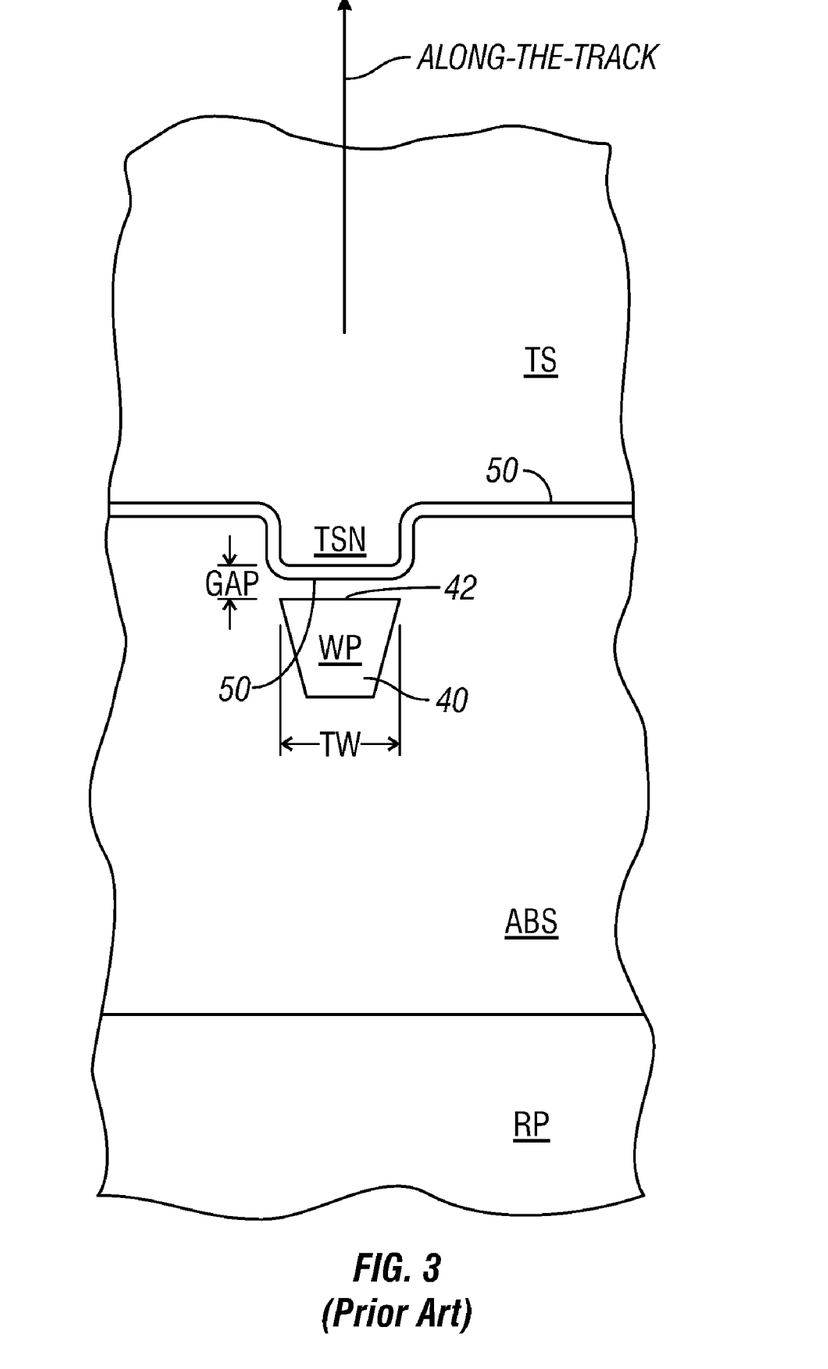
FIG. 3 is a view of the slider ABS for the system of FIG. 1A, as seen from the disk, and shows portions details of the WP, the TSN and the gap between the WP and the TSN.

FIG. 1A also shows a section of a trailing shield (TS) with a trailing shield notch (TSN) that is near the WP but spaced from the WP by a gap of nonmagnetic material. The use of a TS separated from the WP by a nonmagnetic gap slightly alters the angle of the write field and makes writing more efficient. The TSN causes a stronger magnetic field below the WP and sharper magnetic transitions written by the head, which is desirable. FIG. 1B is a view in the direction 1B-1B of FIG. 1A and illustrates the width of the WP to substantially define the trackwidth (TW) of the data recorded in the RL. The TS is substantially wider than the WP in the cross-track direction but the TSN portion is generally the same width as the WP. FIG. 2 is a perspective view showing the relationship between the WP, the TS with TSN, and the recording medium with the RL and SUL. FIG. 3 is a view of the slider ABS, as seen from the disk, and shows portions of the write head, with details of the WP, the TSN and the gap between the WP and the TSN. The WP has an end 40 generally parallel to the ABS and a trailing edge 42 that is generally orthogonal to the along-the-track direction and generally defines the TW.

FIG. 3 shows a WP, gap layer and TS for a just single write head. However a large number of write heads are fabricated simultaneously from a single wafer using semiconductor fabrication processes. The gap typically includes an oxide mask layer (such as $Al_2O_3$ or $SiO_2$) as a result of the conventional fabrication process wherein the oxide mask layer is formed over the layer of magnetic material used to form the WP. A resist is formed over the oxide mask and the structure is then ion milled to form the WP. After removal of the resist, the oxide mask remains above the WP. A thin film 50 of additional electrically conductive gap material, such as Ta or Rh, may optionally be deposited over the oxide mask, followed by electroplating of the magnetic material, typically NiFe, to form the TSN and the remainder of the TS.

The method for patterning the WP to the desired shape and TW requires the use of a silicon-containing hard mask layer, such as silicon dioxide ($SiO_2$), which is used to pattern the resist layer in the desired shape for subsequent patterning of the WP. The hard mask requires the use of an adhesion layer on the resist layer and reactive ion etching (RIE) in a fluorine-containing gas. The RIE process is difficult to control, making it difficult to uniformly pattern a large number of write heads on a single wafer. Additionally, the use of RIE requires the interruption of the fabrication process because the wafer must be removed from the RIE tool for the subsequent ion milling to form the WP.

What is needed is a method for making the write pole of a perpendicular magnetic recording write head that does not require RIE or multiple processing stations and that results in a write pole with a more precisely defined TW.

SUMMARY OF THE INVENTION

The invention is a method for making a write pole in a perpendicular magnetic recording write head. A layer of magnetic write pole material and a layer of nonmagnetic gap material are located on a wafer from which a large number of write heads are to be fabricated. A layer of primary resist is deposited over the gap layer and a metal mask layer is deposited on the primary resist layer without an intermediate adhesion layer. The primary resist layer is an organic mask material, like a polyimide mixture, and the metal mask layer may be a metal such as tantalum (Ta), ruthenium (Ru) or a NiFe alloy. An imaging resist layer is formed on the metal mask layer and lithographically patterned generally in the desired shape of the write pole. Ion milling without a reactive gas is then performed over the imaging resist pattern to pattern the underlying metal mask layer, which is then used as the mask to define the shape of the primary resist pattern. Ion milling with oxygen is then performed over the metal mask pattern to pattern the underlying primary resist. The wafer may be rotated during this ion milling step. Ion milling without a reactive gas is then performed over the primary resist pattern, typically while the wafer is being rotated, to form the underlying write pole and gap layer to the desired shape and trackwidth. All of the ion milling steps are be performed in a single chamber, so there is no interruption of the process.

For a fuller understanding of the nature and advantages of the present invention, reference should be made to the following detailed description taken together with the accompanying figures.

DETAILED DESCRIPTION OF THE INVENTION

FIGS. 4A-4F illustrate the steps in the prior art method for forming the WP. The structure shown in FIG. 4A includes a "substrate" 100, which is typically an alumina ($Al_2O_3$) layer, deposited on the wafer from which a large number of read/write heads are fabricated. The layers for forming the read head are not shown and are typically deposited first on the wafer and would be located below the substrate 100 in FIG. 4A. A WP layer 110 of magnetic material is deposited on the substrate to a thickness corresponding to the desired thickness of the WP, typically in the range of about 150-250 nm. The WP layer 110 is typically a laminate of high-moment magnetic material, such as CoFe or NiFe, and is formed by sputtering or electroplating. A full film of an oxide mask layer (such as alumina) is deposited over the WP layer 110, typically by sputtering, and serves as the gap layer 120 between the WP and TSN in the completed write head. The oxide mask layer can be deposited 20-80 nm thick or about 50 nm thick. Other nonmagnetic materials that may serve as the gap layer 120 include tantalum-oxide, silicon-oxide, silicon-nitride and diamond-like carbon. A layer 130 of organic mask material, referred to herein as "resist", is deposited and patterned above the oxide mask layer 120 and underlying WP layer. The resist layer 130 may be a photo-sensitive organic material provided it is not sensitive to radiation at the wavelengths used in other lithographic steps for forming the write head, or a photo-insensitive organic material like Durimide®, a polyimide material available from Arch Chemicals, Inc. The resist layer 130 can be relatively thick, such as 1000-1400 nm thick or about 1200 nm thick. The organic mask material used for the resist layer 130 should be capable of removal by reactive ion etching or milling using $O_2$ or $CO_2$. The resist layer 130 is the primary resist layer that will be patterned and thus serves as the mask for subsequent patterning of the WP. A silicon-containing hard mask layer 140 (such as $SiO_2$) is formed over the resist layer 130. The silicon-containing hard mask layer 140 is used to form the pattern for the underlying resist layer 130, which is then used as the mask for ion milling the structure to define the WP in WP layer 110. The silicon-containing hard mask layer 140 can have a thickness of 50-150 nm or about 100 nm. A thin imaging system (TIS) resist layer 160 is formed on a thin organic anti-reflection coating (ARC) layer 150, which can be a soluble polyimide solution, that is formed on the hard mask layer 140. The ARC layer 150 can be 50-130 nm thick or about 90 nm thick. The thicknesses of the various layers mentioned here are merely typical and can be within a relatively wide range of thicknesses depending on the particular materials used.

Figure 4A:
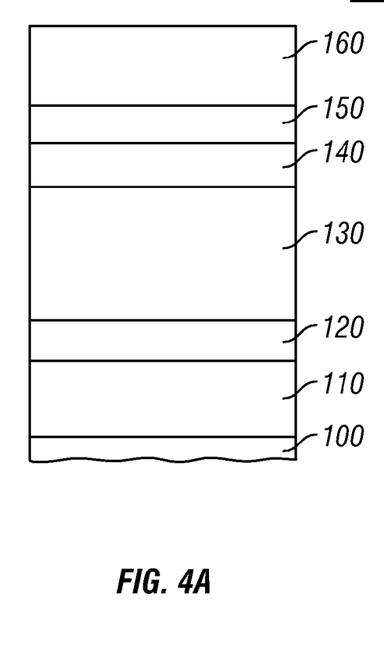
FIGS. 4A-4F illustrate the steps in the prior art method of forming the WP.
Figure 4B:
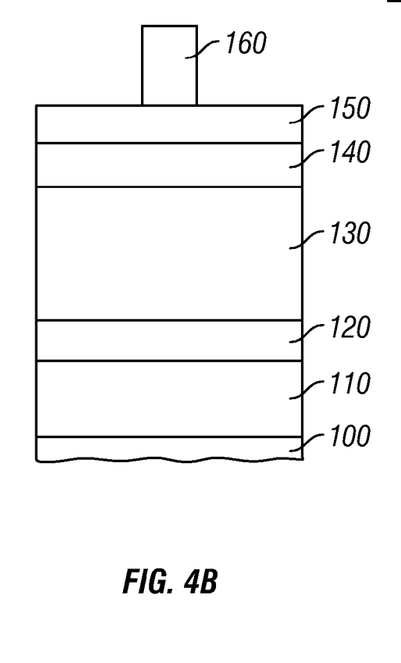
Figure 4C:
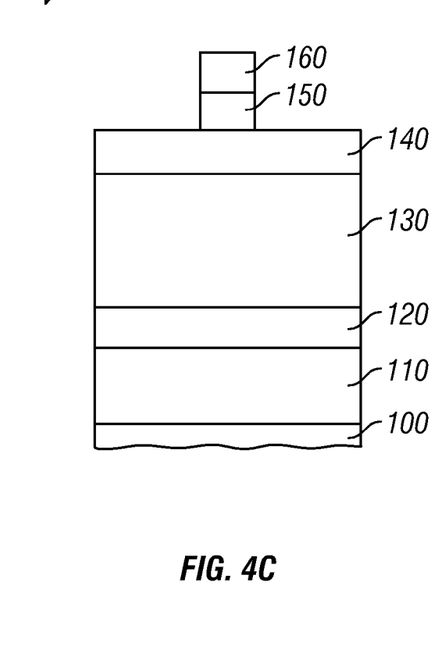
Figure 4D:
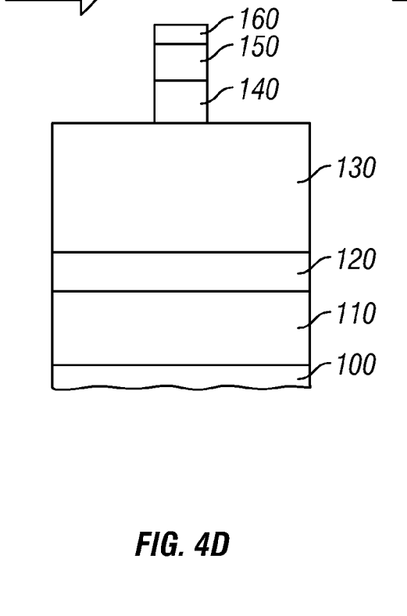
Figure 4E:
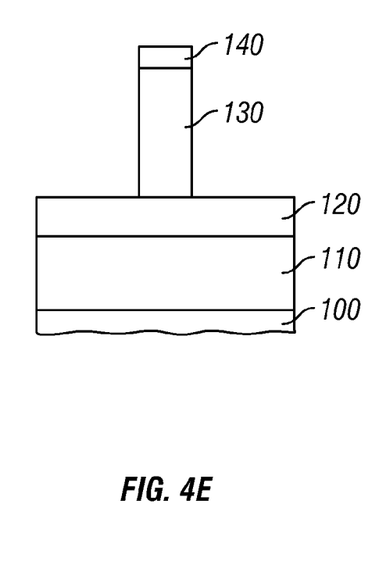
Figure 4F:
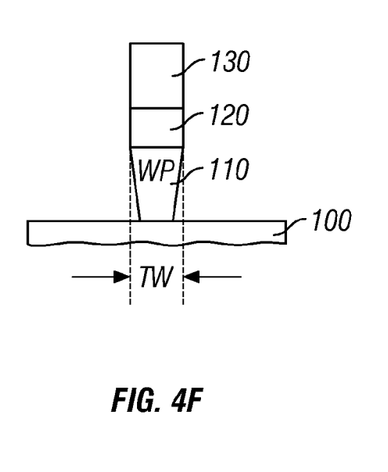

FIG. 4B shows the structure after patterning and photo development of TIS resist 160. The patterned imaging resist 160 generally defines the desired shape of the WP. Next, the structure of FIG. 4B is etched, for example by reactive ion etching (RIE) in oxygen ($O_2$). This transfers the pattern in resist layer 160 to ARC layer 150 by removing portions of ARC layer 150 in areas not covered by resist layer 160. This RIE also removes a portion of the patterned resist layer 160, and exposes the silicon-containing hard mask 140, resulting in the structure shown in FIG. 4C. Next, the pattern is transferred to the silicon-containing hard mask 140 by RIE in a fluorine-based gas, such as $CHF_3$ or $CF_4$. The RIE with a fluorine-based gas is required to remove the silicon-containing hard mask in regions not covered by the previously patterned layers 150, 160, and results in the structure shown in FIG. 4D. The silicon-containing hard mask layer 140 is now patterned as a mask above the resist layer 130. Next, the structure is etched by RIE in $O_2$ with the silicon-containing hard mask layer 140 acting as a hard mask for the underlying resist layer 130, resulting in the structure shown in FIG. 4E. The precise patterning of the silicon-containing hard mask 140, as shown in 4D, is critical because it will define the pattern for the underlying resist layer 130, which will in turn define the WP to the desired TW. The structure of FIG. 4E is then removed from the RIE tool and placed in the ion milling tool. Ion milling with Ar+ ions over the patterned resist layer 130 removes the gap layer 120 and WP layer 110 to form the WP with the desired TW on the substrate 100, as shown by the structure of FIG. 4F. This ion milling creates the beveled edges of the WP, resulting in the WP having a generally trapezoidal shape. The wafer is typically rotated during this ion milling step.

Figure 5A:
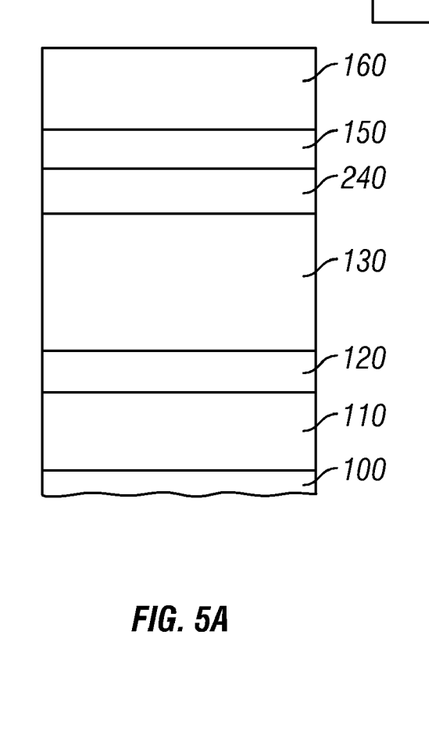
FIGS. 5A-5F illustrate the steps in forming the WP using the method of this invention.
Figure 5B:
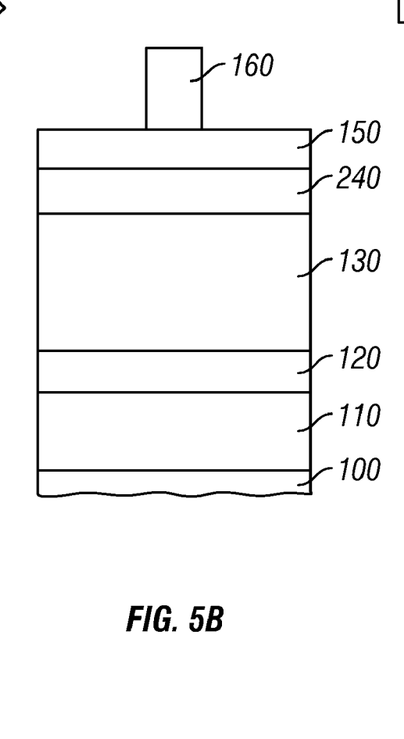
Figure 5C:
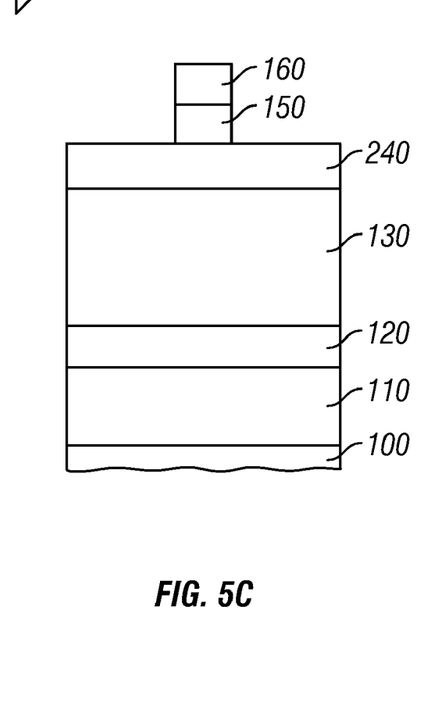
Figure 5D:
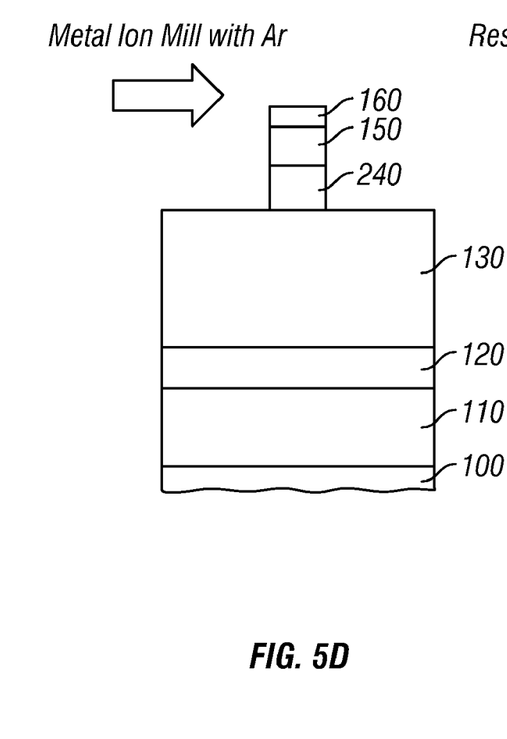
Figures 5E, 5F:
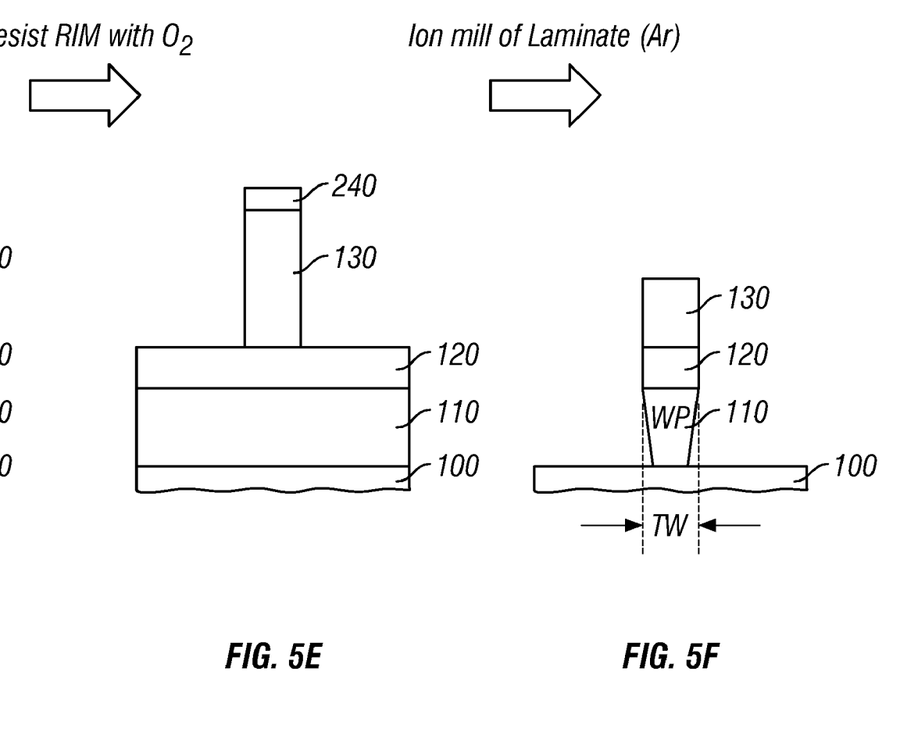

FIGS. 5A-5F illustrate the steps in forming the WP using the method of this invention. In FIG. 5A the structure is the same as in FIG. 4A except that the silicon-containing hard mask layer has been replaced with a metal mask layer 240. Metal mask layer 240 is preferably tantalum (Ta), ruthenium (Ru) or a NiFe alloy, and has a thickness in the range of about 20 to 70 nm. No adhesion layer is required between the metal mask layer 240 and resist layer 130. The metal of layer 240, unlike the hard mask $SiO_2$ material, does not require RIE for its removal and thus a RIE chamber is not required. Next, the structure of FIG. 5B is ion milled, for example by reactive ion milling (RIM) in oxygen ($O_2$). This transfers the pattern in resist layer 160 to ARC layer 150 by removing portions of ARC layer 150 in areas not covered by resist layer 160. This RIM also removes a portion of the patterned resist layer 160, and exposes the metal mask layer 140, resulting in the structure shown in FIG. 5C. Next, the pattern is transferred to the metal mask layer 240 by ion milling with Ar+ ions without a reactive gas, and results in the structure shown in FIG. 5D. The metal mask layer 240 is now patterned as a mask above the resist layer 130. The metal hard mask 240, as shown in FIG. 5D, is more precisely formed and is more uniformly patterned across the entire wafer than it would be if it were patterned by RIE, because the ion milling process is easier to control. In addition, unlike in RIE, the wafer may be rotated during ion milling to further improve uniformity. Next, the structure is ion milled, for example by reactive ion milling (RIM) in oxygen ($O_2$), with the metal mask layer 240 acting as a hard mask for the underlying resist layer 130, resulting in the structure shown in FIG. 5E. The structure of FIG. 5E is then ion milled in Ar+ ions. This ion milling over the patterned resist layer 130 removes the gap layer 120 and WP layer 110 to form the WP with the desired TW on the substrate 100, as shown by the structure of FIG. 5F. All of the ion milling steps shown in FIGS. 5A-5F can be performed in a single chamber, so there is no need to interrupt the process flow, as is required if RIE is used.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for making a perpendicular magnetic recording write head having a write pole, a trailing shield, and a gap layer between the write pole and the trailing shield, the method comprising:

depositing on a substrate a layer of magnetic write pole material having the desired thickness for the write pole;

depositing a layer of gap material on the write pole layer;

depositing a primary resist layer on the gap layer;

depositing a metal mask layer on the resist layer;

depositing an anti-reflection coating on the metal mask layer;

forming an imaging resist pattern on the anti-reflection coating, the imaging resist pattern generally defining the desired shape of the write pole;

ion milling over the imaging resist pattern to remove the anti-reflection coating in regions not covered by the imaging resist pattern;

ion milling without a reactive gas over the imaging resist pattern to pattern the metal mask layer, removing the metal mask layer in regions not covered by the imaging resist pattern and exposing the underlying primary resist layer;

ion milling over the metal mask pattern to pattern the primary resist layer, removing the primary resist layer in regions not covered by the metal mask pattern; and ion milling without a reactive gas over the primary resist pattern to pattern the underlying gap layer and write pole material.

2. The method of claim 1 wherein depositing a metal mask layer comprises depositing a layer of material selected from the group consisting of Ta, Ru, and a NiFe alloy.

3. The method of claim 1 wherein ion milling to remove the anti-reflection coating comprises ion milling in oxygen.

4. The method of claim 1 wherein ion milling to pattern the primary resist layer comprises ion milling in oxygen.

5. The method of claim 4 farther comprising rotating the substrate during ion milling to pattern the primary resist layer.

6. The method of claim 1 wherein depositing a primary resist layer comprises depositing a polyimide.

* * * * *